United States Patent
Ota (10) Patent No.: US 10,602,105 B2
(45) Date of Patent: Mar. 24, 2020

(54) PROJECTOR AND METHOD FOR CONTROLLING PROJECTOR

(71) Applicant: SEIKO EPSON CORPORATION, Tokyo (JP)

(72) Inventor: Susumu Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/260,351

(22) Filed: Jan. 29, 2019

(65) Prior Publication Data

US 2019/0238805 A1   Aug. 1, 2019

(30) Foreign Application Priority Data

Jan. 30, 2018   (JP) ................. 2018-013826

(51) Int. Cl.
*G03B 21/14* (2006.01)
*H04N 9/31* (2006.01)
*G03B 21/53* (2006.01)

(52) U.S. Cl.
CPC .......... *H04N 9/317* (2013.01); *G03B 21/142* (2013.01); *G03B 21/53* (2013.01); *H04N 9/3197* (2013.01)

(58) Field of Classification Search
CPC ..... G03B 21/147; G03B 21/142; G03B 21/14; G03B 21/53; H04N 9/317
See application file for complete search history.

(56) References Cited

U.S. PATENT DOCUMENTS

2002/0105623 A1 *   8/2002   Pinhanez ............... G03B 21/28
                                                    353/69

FOREIGN PATENT DOCUMENTS

JP   2007-322791 A   12/2007

* cited by examiner

*Primary Examiner* — Ryan D Howard
(74) *Attorney, Agent, or Firm* — Oliff PLC (57) ABSTRACT

A projector includes a projection section capable of projecting an image according to image information in a predetermined area, an acquisition section that acquires position identification information that identifies a position that should be brought into focus in the predetermined region, and a control section that controls the projection section based on the position identification information in such a way that the position is brought into focus.

14 Claims, 6 Drawing Sheets

| SUB-REGION | 6-1 | 6-2 | ... | 6-12 |
|---|---|---|---|---|
| FOCUS INFORMATION | aaa | aaa | ... | bbb |

PROJECTOR AND METHOD FOR CONTROLLING PROJECTOR

The entire disclosure of Japanese Patent Application No. 2018-013826, filed Jan. 30, 2018, is expressly incorporated by reference herein.

BACKGROUND

1. Technical Field

The present invention relates to a projector and a method for controlling the projector.

2. Related Art

JP-A-2007-322791 describes a projector having a focus adjustment function. The projector moves a projection lens to adjust the focusing based on the distance from the projector to a projection surface.

In a case where the projector having the focus adjustment function described in JP-A-2007-322791 projects an image on a projection region formed of a non-flat surface (spherical surface or stepped surface, for example), it is difficult to bring the entire projection region into focus.

Therefore, when a portion of interest (important portion, for example) of the image projected in the projection region is not brought into focus, a user needs to manually adjust the focusing, resulting in low usability.

SUMMARY

An advantage of some aspects of the invention is to provide a technology that allows improvement in usability relating to focus adjustment performed on a projector.

An aspect of a projector according to the invention includes a projection section capable of projecting an image according to image information in a predetermined area, an acquisition section that acquires position identification information that identifies a position that should be brought into focus in the predetermined region, and a control section that controls the projection section based on the position identification information in such a way that the position is brought into focus.

According to the aspect described above, even in a case where the predetermined region is, for example, a non-flat surface, an image portion projected in a position in the predetermined region that is the position that should be brought into focus can be brought into focus. The necessity of a user's manual focus adjustment therefore lowers, whereby usability relating to the focus adjustment performed on the projector can be improved.

In the aspect of the projector described above, it is desirable that the position is a region where the projection section projects an image.

According to the aspect described above, in a case where an image is projected, for example, only in part of the predetermined region, the projected image can be automatically brought into focus.

In the aspect of the projector described above, it is desirable that the position identification information is added to the image information, and that the acquisition section acquires the position identification information added to the image information.

According to the aspect described above, a portion of the image according to the image information that is the portion to be brought into focus can be set in advance by using the position identification information, and the focus adjustment can be performed by using the position identification information.

In the aspect of the projector described above, it is desirable that the projector further includes a generation section that generates the position identification information based on the image information, and that the acquisition section acquires the position identification information generated by the generation section.

According to the aspect described above, a portion of the image according to the image information that is the portion that should be brought into focus can be set in accordance with the image. Therefore, the image portion that should be brought into focus can be brought into focus, for example, with no position identification information prepared in advance.

In the aspect of the projector described above, it is desirable that the image is an image generated by using a first image and a second image that imparts a rendering effect to the first image, that the image information contains image data representing the first image and rendering effect data representing the second image, and that the generation section generates the position identification information based on the rendering effect data.

According to the aspect described above, a portion of the first image that is the portion enhanced by the rendering effect image can be brought into focus.

In the aspect of the projector described above, it is desirable that the projection section includes a projection system that projects the image, and that the control section controls the projection system based on the position identification information in such a way that the position is brought into focus.

According to the aspect described above, the position that should be brought into focus can be brought into focus by controlling the projection system.

In the aspect of the projector described above, it is desirable that the projection section further includes a light source that emits light and a light modulator that modulates the light from the light source in accordance with the image information, that the position identification information represents a first region where an image to be projected in the position is generated out of a plurality of regions that form an image region of the light modulator, and that the control section controls the projection system in such a way that the image generated in the first region is brought into focus in the position.

According to the aspect described above, the position identification information represents a region of the image region of the light modulator that is the region where an image to be projected in the position that should be brought into focus is generated. The position identification information can therefore be set in accordance with a position in the image region of the light modulator that is the position of the image to be projected in the position that should be brought into focus.

In the aspect of the projector described above, it is desirable that the projection section projects an image having a predetermined shape.

According to the aspect described above, also in the case where the image having a predetermined shape is projected, an image portion projected in a position in the predetermined region that is the position that should be brought into focus can be brought into focus.

In the aspect of the projector described above, it is desirable that the predetermined region is a non-flat surface.

According to the aspect described above, also in the case where the predetermined region is a non-flat surface, an image portion projected in a position in the predetermined region that is the position that should be brought into focus can be brought into focus.

An aspect of a projector controlling method according to the invention is a method for controlling a projector including a projection section capable of projecting an image according to image information in a predetermined area, the method including acquiring position identification information that identifies a position that should be brought into focus in the predetermined region and controlling the projection section based on the position identification information in such a way that the position is brought into focus.

According to the aspect described above, even in a case where the predetermined region is, for example, a non-flat surface, an image portion projected in a position in the predetermined region that is the position that should be brought into focus can be brought into focus. The necessity of the user's manual focus adjustment therefore lowers, whereby usability relating to the focus adjustment performed on the projector can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention will be described below with reference to the drawings. In the drawings, the dimension and scale of each portion differ from actual values as appropriate. Further, since the embodiment described below is a preferable specific example of the invention, a variety of technically preferable restrictions are imposed on the embodiment. The scope of the invention is, however, not limited to the embodiment unless the following description particularly states that the restrictions are imposed on the invention.

First Embodiment

Figure 1:
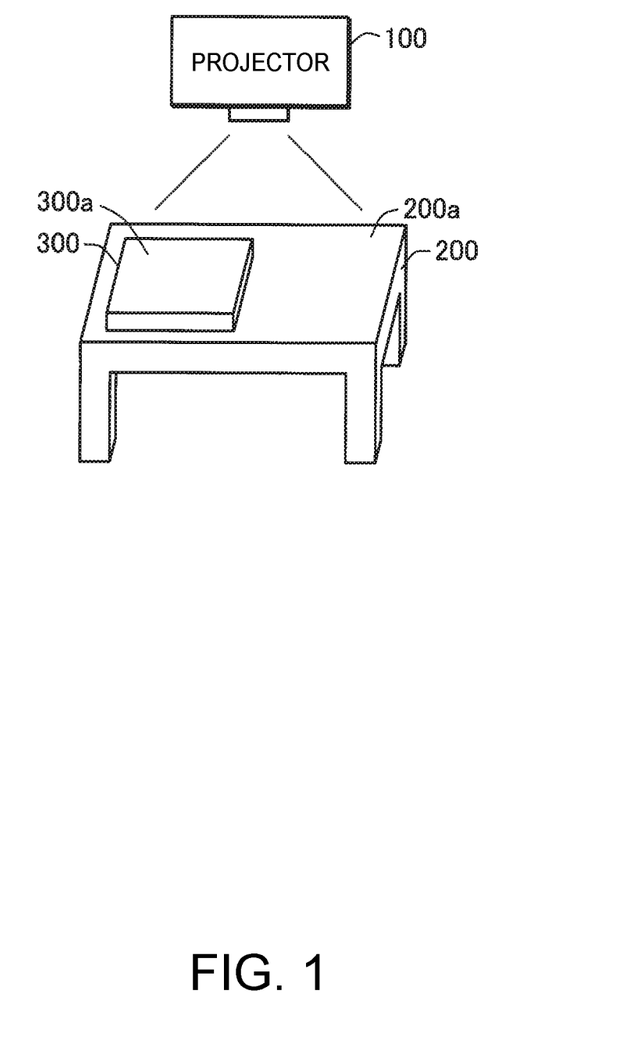
FIG. 1 shows a projector according to a first embodiment.

FIG. 1 shows a projector 100 according to a first embodiment. The projector 100 can project an image according to image information (hereinafter also referred to as "content image") on a table surface 200a of a table 200. The table surface 200a is an example of a predetermined region. The predetermined region is not limited to the table surface 200a and can be changed as appropriate.

An object 300 having a box-like shape is placed on the table surface 200a. Therefore, when the projector 100 projects a content image that extends across the table surface 200a, part of the content image is projected on a surface 300a of the object 300 and the remainder of the content image is projected on the table surface 200a. The table surface 200a on which the object 300 has been placed is another example of the predetermined region. The shape of the object 300 is not limited to a box-like shape and can be changed as appropriate.

Since the object 300 is placed on the table surface 200a, the distance from the projector 100 to the table surface 200a differs from the distance from the projector 100 to the surface 300a. Therefore, in a case where the projector 100 projects a content image in such a way that the table surface 200a is brought into focus, for example, in a situation in which an important portion of the content image is projected on the surface 300a, the important portion projected on the surface 300a is not undesirably brought into focus.

To avoid the undesirable situation described above, the projector 100 according to the present embodiment uses position identification information that identifies a position on the table surface 200a on which the object 300 has been placed that is the position that should be brought into focus (surface 300a, for example) to control the projection of the content image in such a way that the position that should be brought into focus is brought into focus.

Figure 2:
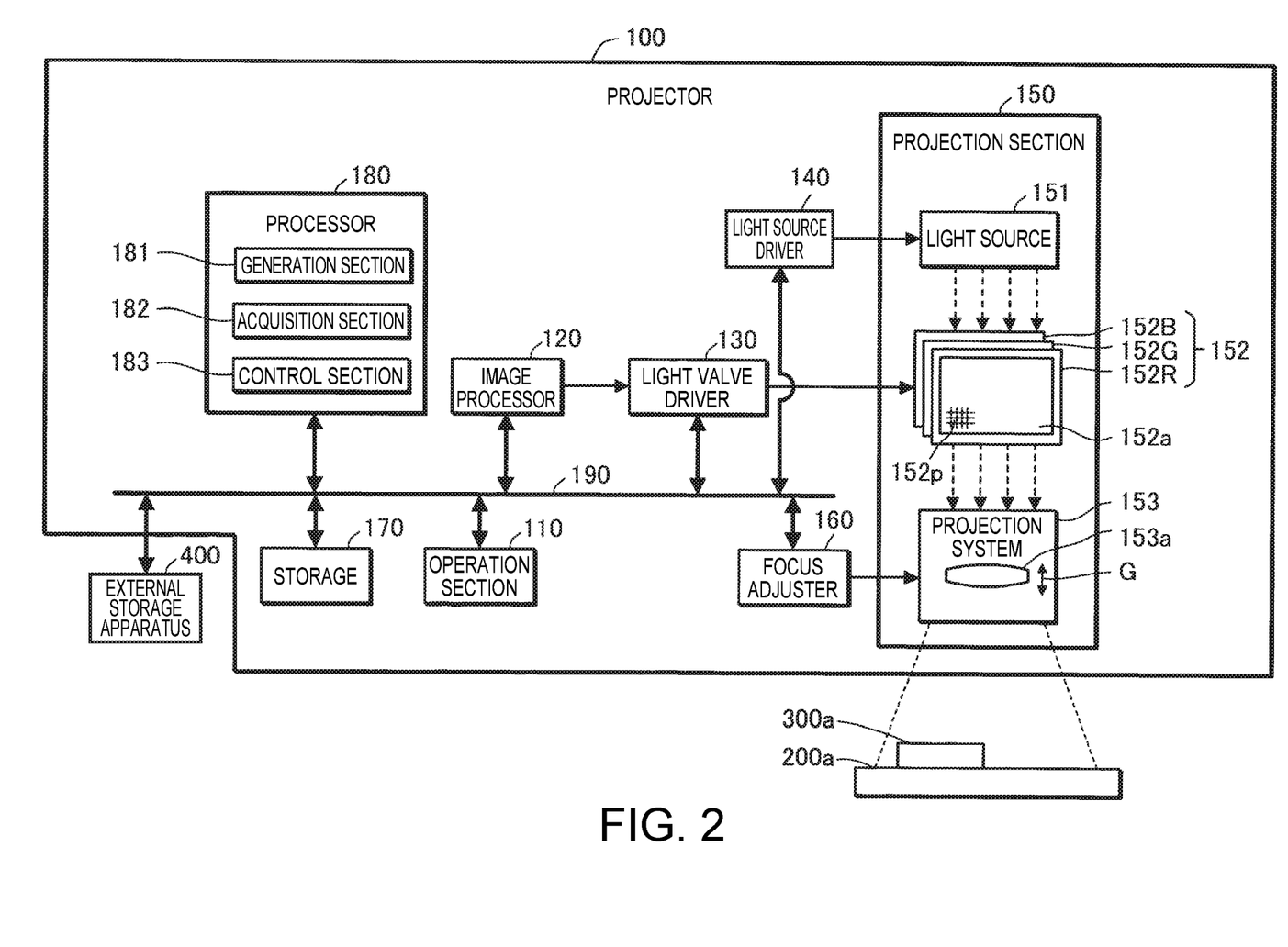
FIG. 2 shows an example of the projector.

The configuration of the projector 100 will next be described. FIG. 2 shows an example of the projector 100.

The projector 100 includes an operation section 110, an image processor 120, a light valve driver 130, a light source driver 140, a projection section 150, a focus adjuster 160, a storage 170, a processor 180, and a bus 190. The projection section 150 includes a light source 151, three liquid crystal light valves 152 (152R, 152G, and 152B), and a projection system 153. The projection system 153 includes a projection lens 153a.

An external storage apparatus 400 is connected to the projector 100 via an interface that is not shown. The external storage apparatus 400 is, for example, an SD memory card or any other card-shaped recording medium or a USB (universal serial bus) memory device.

The operation section 110, the image processor 120, the light valve driver 130, the light source driver 140, the focus adjuster 160, the storage 170, the processor 180, and the external storage apparatus 400 can communicate with each other via the bus 190.

The external storage apparatus 400 stores image information on each of a plurality of content images. The image information contains image data and rendering effect data. The image data represents an image. The rendering effect data represents a rendering image that imparts a rendering effect to the image that the image data represents (hereinafter also referred to as "original image"). The original image is an example of a first image, and the rendering image is an example of a second image. In the present embodiment, the content image is the original image on which the rendering image has been superimposed. The content image is not limited to the original image on which the rendering image has been superimposed and can be changed as appropriate.

For example, the content image only needs to be an image generated by using the original image and the rendering image.

Figure 3:
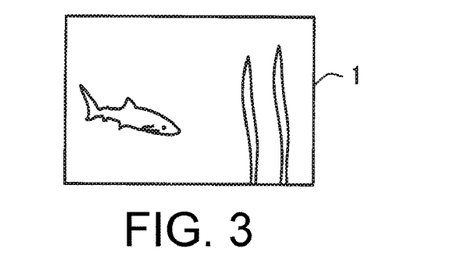
FIG. 3 shows an image that is an example of an original image.
Figure 4:
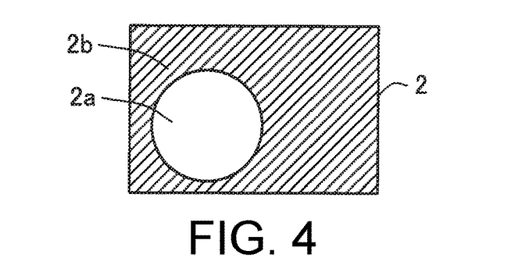
FIG. 4 shows an image that is an example of a rendering image.

FIG. 3 shows an image 1, which is an example of the original image. FIG. 4 shows an image 2, which is an example of the rendering image. The image 2 contains a circular transparent region 2a and a black region 2b.

Figure 5:
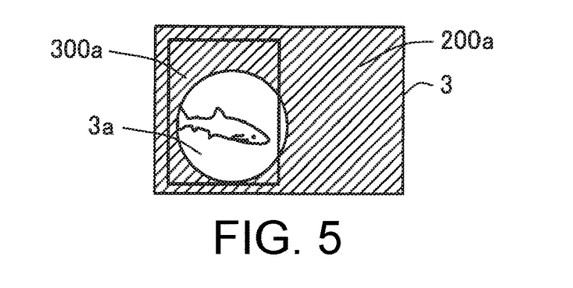
FIG. 5 shows an example of projection of a content image.

FIG. 5 shows an example in which a content image 3, which is the image 1 on which the image 2 has been superimposed, is projected on the table surface 200a on which the object 300 has been placed. In the content image 3, only a portion 3a, on which the transparent region 2a of the image 2 has been superimposed, (hereinafter also referred to as "sub-image") is left out of the image 1, and the other portion of the image 1 is drawn black. The sub-image 3a is a circular image. The circular shape is an example of a predetermined shape. The predetermined shape is not limited to a circular shape and can be changed as appropriate. At least half the sub-image 3a is projected on the surface 300a. The projector 100 therefore projects the content image 3 (sub-image 3a) in such a way that the sub-image 3a is brought into focus on the surface 300a.

Figure 6:
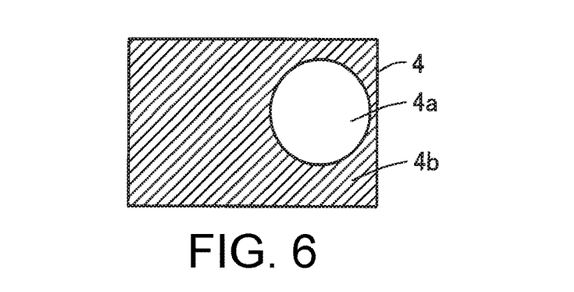
FIG. 6 shows an image that is another example of the rendering image.

FIG. 6 shows an image 4, which is another example of the rendering image. The image 4 contains a circular transparent region 4a and a black region 4b.

Figure 7:
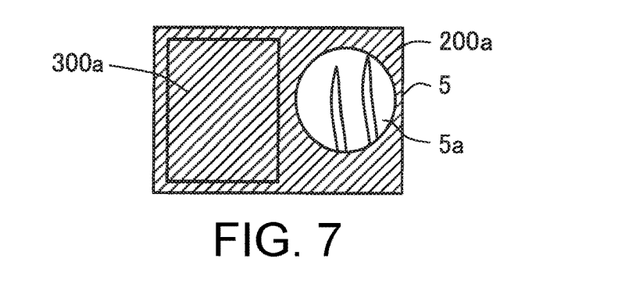
FIG. 7 shows an example of projection of another content image.

FIG. 7 shows an example in which a content image 5, which is the image 1 on which the image 4 has been superimposed, is projected on the table surface 200a on which the object 300 has been placed. In the content image 5, only a portion 5a, on which the transparent region 4a of the image 4 has been superimposed (sub-image) is left out of the image 1, and the other portion of the image 1 is drawn black. The sub-image 5a is projected on the table surface 200a. The projector 100 therefore projects the content image 5 (sub-image 5a) in such a way that the sub-image 5a is brought into focus on the table surface 200a.

The description with reference to FIG. 2 will be resumed.

The operation section 110 is formed, for example, of a variety of operation buttons or operation keys or a touch panel. The operation section 110 accepts an input operation performed by a user of the projector 100 (hereinafter simply referred to as "user"). The operation section 110 may, for example, instead be a remote control that transmits information according to the user's input operation wirelessly or via a cable. In this case, the projector 100 includes a receiver that receives the information transmitted by the remote control. The remote control includes a variety of operation buttons or operation keys or a touch panel that accepts the user's input operation.

The image processor 120 uses the image data and the rendering effect data stored in the external storage apparatus 400 to generate an image signal representing a content image.

The light valve driver 130 drives the liquid crystal light valves 152 (152R, 152G, and 152B) based on the image signal generated by the image processor 120.

The light source driver 140 drives the light source 151. For example, the light source driver 140 causes the light source 151 to emit light when the operation section 110 accepts power-on operation.

The projection section 150 can project a content image on the table surface 200a, in more detail, the table surface 200a on which the object 300 has been placed (see FIGS. 5 and 7). In the projection section 150, the liquid crystal light valves 152 modulate light emitted from the light source 151 to generate image light that is a content image, and the projection system 153 enlarges and projects the image light on the table surface 200a (table surface 200a on which object 300 has been placed).

The light source 151 is, for example, a xenon lamp, an ultrahigh-pressure mercury lamp, a light emitting diode (LED), or a laser light source. The light source 151 emits light. The light emitted from the light source 151 passes through an optical integration system that is not shown, which reduces variation in the luminance distribution of the light, and the resultant light is then separated by a color separation system that is not shown into red (R), green (G), and blue (B) light components, which are the three primary colors of light. The R, G, and B light components are incident on the liquid crystal light valves 152R, 152G, and 152B, respectively.

The liquid crystal light valves 152 are an example of a light modulator. The liquid crystal light valves 152 modulate the light emitted from the light source 151 to generate image light (content image) in accordance with the image signal (image information). The liquid crystal light valves 152 are each formed, for example, of a liquid crystal panel in which a liquid crystal material is encapsulated between a pair of transparent substrates. The liquid crystal light valves 152 each have a rectangular pixel region 152a formed of a plurality of pixels 152p arranged in a matrix. The pixel region 152a is an example of an image region. In each of the liquid crystal light valves 152, drive voltage is applicable to the liquid crystal material for each of the pixels 152p.

When the light valve driver 130 applies drive voltage according to the image signal to each of the pixels 152p, the optical transmittance of the pixel 152p is set at a value according to the image signal. The light emitted from the light source 151 is therefore modulated when passing through each of the pixel regions 152a to form an image according to the image signal on a color basis. The color images are combined with one another by a light combining system that is not shown on a pixel basis or for each of the pixels 152p into color image light (content image).

The projection system 153, specifically, the projection lens 153a enlarges and projects the image light generated by the liquid crystal light valves 152 onto the table surface 200a (table surface 200a on which object 300 has been placed).

The focus adjuster 160 moves the projection lens 153a in the direction indicated by the arrow G and parallel to the optical axis of the projection lens 153a to perform the focus adjustment.

The storage 170 is a computer readable recording medium. The storage 170 stores a program that specifies the action of the projector 100 and a variety of pieces of information. The storage 170 further includes a frame memory in which the image information is developed.

The processor 180 is a computer, such as a CPU (central processing unit). The processor 180 may be formed of one or more processors. The processor 180 reads and executes the program stored in the storage 170 to achieve a generation section 181, an acquisition section 182, and a control section 183.

The generation section 181 generates based on the image information the position specification information, which identifies a position on the table surface 200a on which the object 300 has been placed that is the position that should be brought into focus.

In the present embodiment, the generation section 181 first identifies the position of the transparent region of the rendering image based on image information on a content image to be projected out of the image information stored in the external storage apparatus 400. The generation section 181 subsequently generates the position identification information based on the position of the transparent region of the rendering image. For example, the generation section 181 generates, as the position identification information, information for identifying a region of the table surface 200a on which the object 300 has been placed that is the region where an image corresponding to the transparent region of the rendering image is projected.

The acquisition section 182 acquires the position identification information. In the present embodiment, the acquisition section 182 acquires the position identification information generated by the generation section 181.

The control section 183 controls the projection section 150 based on the position identification information acquired by the acquisition section 182 in such a way that the position identified by the position identification information is brought into focus. For example, in the present embodiment, the control section 183 uses the focus adjuster 160 to control the projection system 153 in such a way that the position identified by the position identification information is brought into focus. In the present embodiment, the control section 183 causes the focus adjuster 160 to move the projection lens 153a in such a way that the position identified by the position identification information is brought into focus.

The action of the projector 100 will next be described.

Figure 8:
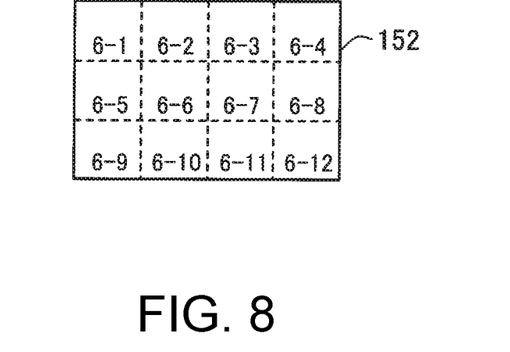
FIG. 8 shows an example of division of a pixel region.

In the present embodiment, the pixel region 152a of each of the liquid crystal light valves 152 is divided into a plurality of sub-regions in advance. FIG. 8 shows an example of the division of the pixel region 152a. In the example shown in FIG. 8, the pixel region 152a is divided into 12 sub-regions 6-1 to 6-12 in a matrix formed of 3 vertically arranged rows and 4 horizontally arranged columns. The sub-regions 6-1 to 6-12 have the same shape and area.

Figure 9:
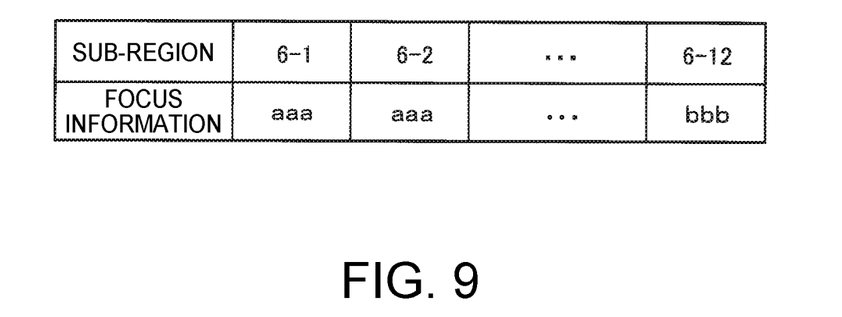
FIG. 9 shows an example of focus information associated with each sub-region.

The user causes the storage 170 to store focus information on a sub-region basis before causing the projector 100 to project a content image. The focus information represents the position of the projection lens 153a where an image generated in each of the sub-regions is brought into focus on the table 200a on which the object 300 has been placed. FIG. 9 shows an example of the focus information associated with each of the sub-regions.

The user first performs operation of generating the focus information (hereinafter also referred to as "generation operation") on the operation section 110. When the operation section 110 accepts the generation operation, the control section 183 first controls the image processor 120 to cause it to generate a pattern image for focus adjustment (hereinafter also simply referred to as "pattern image") in the sub-region 6-1. The projection section 150 projects the pattern image generated in the sub-region 6-1 on the table 200a on which the object 300 has been placed.

Figure 10:
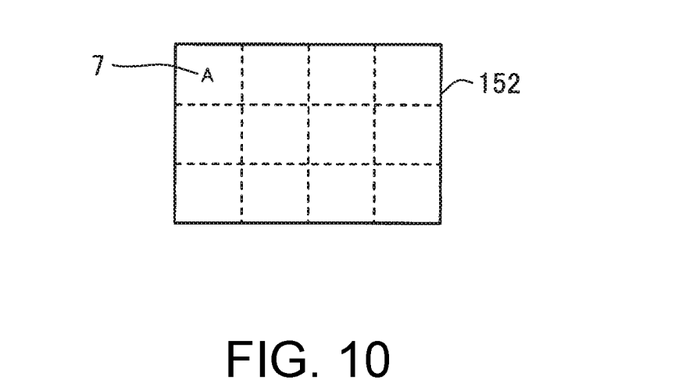
FIG. 10 shows an example of a pattern image generated in one of the sub-regions.

FIG. 10 shows an example of a pattern image 7 generated in the sub-region 6-1. The pattern image 7 is located in a central region of the sub-region 6-1. In FIG. 10, an image representing "A" is used as the pattern image 7, but the pattern image 7 is not limited to the image representing "A" and can be changed as appropriate.

The user then adjusts the position of the projection lens 153a in such a way that the pattern image 7 in the sub-region 6-1 is brought into focus.

The user subsequently performs operation of storing the position of the projection lens 153a (hereinafter also referred to as "storage operation") on the operation section 110.

When the operation section 110 accepts the storage operation, the control section 183 stores the information representing the current position of the projection lens 153a as the focus information associated with the sub-region 6-1 in the storage 170.

The same action as that performed in association with the sub-region 6-1 is then performed also in association with each of the sub-regions 6-2 to 6-12. The order in which the focus information is generated in association with the sub-regions 6-1 to 6-12 can be changed as appropriate.

The action of projecting a content image performed by the projector 100 (hereinafter also referred to as "projection action") will next be described.

Figure 11:
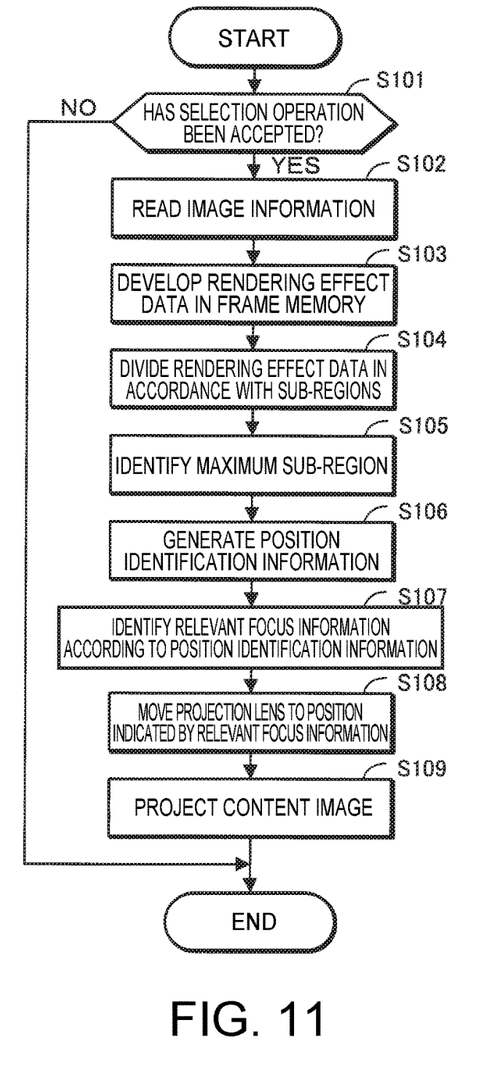
FIG. 11 is a flowchart for describing a projection action.

FIG. 11 is a flowchart for describing the projection action.

When the user performs operation of selecting any of the plurality of pieces of image information stored in the external storage apparatus 400 (hereinafter also referred to as "selection action") on the operation section 110, the operation section 110 accepts the selection operation (step S101). In the following description, it is assumed for simplification of the description that image information containing image data representing the image 1 (see FIG. 3) and rendering effect data representing the image 2 (see FIG. 4) have been selected by the selection operation.

When the operation section 110 accepts the selection operation, the generation section 181 reads the image information selected by the selection operation from the external storage apparatus 400 (step S102).

The generation section 181 subsequently develops the rendering effect data contained in the image information in the frame memory provided in the storage 170 (step S103).

Figure 12:
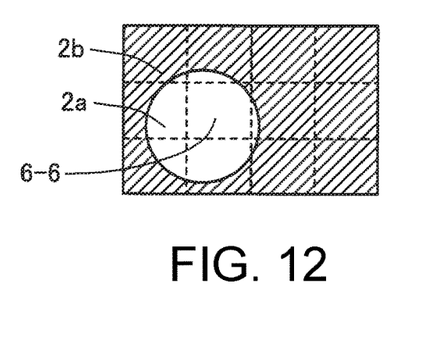
FIG. 12 shows an example of division of rendering effect data representing the image shown in FIG. 4.

The generation section 181 subsequently divides the rendering effect data developed in the frame memory in accordance with the sub-regions shown in FIG. 8 (step S104). FIG. 12 shows an example of division of the rendering effect data representing the image 2 divided in accordance with the sub-regions 6-1 to 6-12.

The generation section 181 subsequently identifies a sub-region where the largest area is occupied by the transparent region 2a (hereinafter referred to as "maximum sub-region") out of the sub-regions 6-1 to 6-12 (step S105). The maximum sub-region is an example of a first region where an image to be projected in a position that should be brought into focus is generated. In the example shown in FIG. 12, the generation section 181 identifies the sub-region 6-6 as the maximum sub-region. A region of the table surface 200a on which the object 300 has been placed that is the region where the image generated in the maximum sub-region is projected is an example of the position that should be brought into focus.

The generation section 181 subsequently generates position identification information representing the maximum sub-region (step S106). In the example shown in FIG. 12, the generation section 181 generates position identification information representing the sub-region 6-6.

The acquisition section 182 subsequently acquires the position identification information generated by the generation section 181. When the acquisition section 182 acquires the position identification information, the control section 183 refers to the storage 170 and identifies focus information corresponding to the sub-region indicated by the position identification information (hereinafter also referred to as "relevant focus information") from the focus information associated with the sub-regions (see FIG. 9) (step S107).

The control section 183 subsequently causes the focus adjuster 160 to perform the action of locating the projection lens 153a in the position indicated by the relevant focus information (step S108). Therefore, in the present embodiment, the content image projected from the projection section 150 is brought into focus on the surface 300a.

The control section 183 subsequently causes the image processor 120 to perform the action of generating an image signal representing the content image 3 (see FIG. 5) by using the image data and the rendering effect data read by the generation section 181.

The image processor 120 subsequently provides the light valve driver 130 with the image signal representing the content image 3. The light valve driver 130 supplies the liquid crystal light valves 152 with drive voltage according to the image signal to cause the projection section 150 to generate the content image 3. The projection section 150 projects and displays the content image 3 on the table surface 200a on which the object 300 has been placed (step S109).

At least half the sub-image 3a is incident on the surface 300a, as shown in FIG. 5. The position of the projection lens 153a is set in the position that allows the content image 3 to be brought into focus on the surface 300a. The sub-image 3a, which is the non-black portion of the content image 3, that is, the important portion of the content image 3 is displayed in focus.

The projector 100 and the method for controlling the projector 100 according to the present embodiment allow an image portion of the region where the projection section 150 can project a content image that is the image portion projected in a position (region) that should be brought into focus to be automatically brought into focus. Usability relating to the focus adjustment performed on the projector 100 can therefore be improved.

In the case where the content image 3 is formed of the sub-image 3a and the black region, as shown in FIG. 5, the position that should be brought into focus is a region of the region where the projection section 150 can project the content image 3 that is the region where the sub-image 3a is actually projected. The sub-image 3a can therefore be brought into focus.

The generation section 181 generates the position identification information based on image information. A portion to be brought into focus out of an image according to the image information can therefore be set in accordance with the image according to the image information.

The focus information is set in advance for each of the plurality of sub-regions, and the focus adjustment is performed based on the focus information associated with the maximum sub-region. Therefore, once the focus information is set, the focus information can be used even when the image information changes. The focusing process can therefore be simplified as compared with a case where the focus information is generated whenever the image information changes.

Variations

The invention is not limited to the embodiment described above, and a variety of variations, for example, those that will be described below, are conceivable. Further, one or more variations arbitrarily selected from the following aspects of variations can be combined with one another as appropriate.

Variation 1

In the embodiment described above, the generation section 181 generates the position identification information by using rendering effect data (see FIG. 4) and may instead generate the position identification information based on superimposed image information representing a superposed image formed of an image that image data represents and an image that rendering effect data represents.

For example, in a case where the superimposed image information represents the content image 3 shown in FIG. 5, the generation section 181 develops the superimposed image information in the frame memory and then divides the superimposed image information in accordance with the sub-regions. The generation section 181 subsequently identifies a sub-region where the largest area is occupied by the sub-image 3a as the maximum sub-region out of the sub-regions 6-1 to 6-12. The same processes as those in the embodiment described above are then carried out. In Variation 1, as the image information, image information representing the content image 3 can also be used in place of image information formed of image data and rendering effect data. In this case, the projector 100 can omit the process of generating the image signal representing the content image 3 by using the image data and the rendering effect data, whereby the focusing process can be simplified.

Variation 2

The position identification information may be added to image information in advance. For example, the external storage apparatus 400 stores image information to which position identification information has been added. In this case, the acquisition section 182 acquires the position identification information added to the image information.

In Variation 2, image information does not need to be generated from rendering effect data. Variation 2 is therefore effective also in a case where image information has image data but no rendering effect data (a case where image data represents the content image 3 shown in FIG. 5, for example).

Further, Variation 2 is effective also in a case where image information represents an image having experienced no rendering effect (a case where image information represents the image 1 shown in FIG. 3, for example).

In this case, the position identification information represents, for example, the position (region) of the transparent region 2a shown in FIG. 4, and the control section 183 identifies a sub-region closest to the position (region) indicated by the position identification information out of the sub-regions 6-1 to 6-12 and identifies focus information associated with the identified sub-region as the relevant focus information.

In Variation 2, in a case where the image information represents the image 1 shown in FIG. 3 and the position identification information represents the position of the transparent region 2a shown in FIG. 4, the control section 183 adjusts the position of the projection lens 153a in such a way that the image 1 is brought into focus on the surface 300a.

According to Variation 2, since position identification information is added to image information, a portion to be brought into focus out of an image according to the image information can be specified by using the position identification information.

Variation 3

In a case where projection mapping is performed on a building having irregularities by using a plurality of projectors 100, an aspect in which a projector is assigned to each of flat surfaces of the building may, for example, be used.

Variation 4

Figure 13:
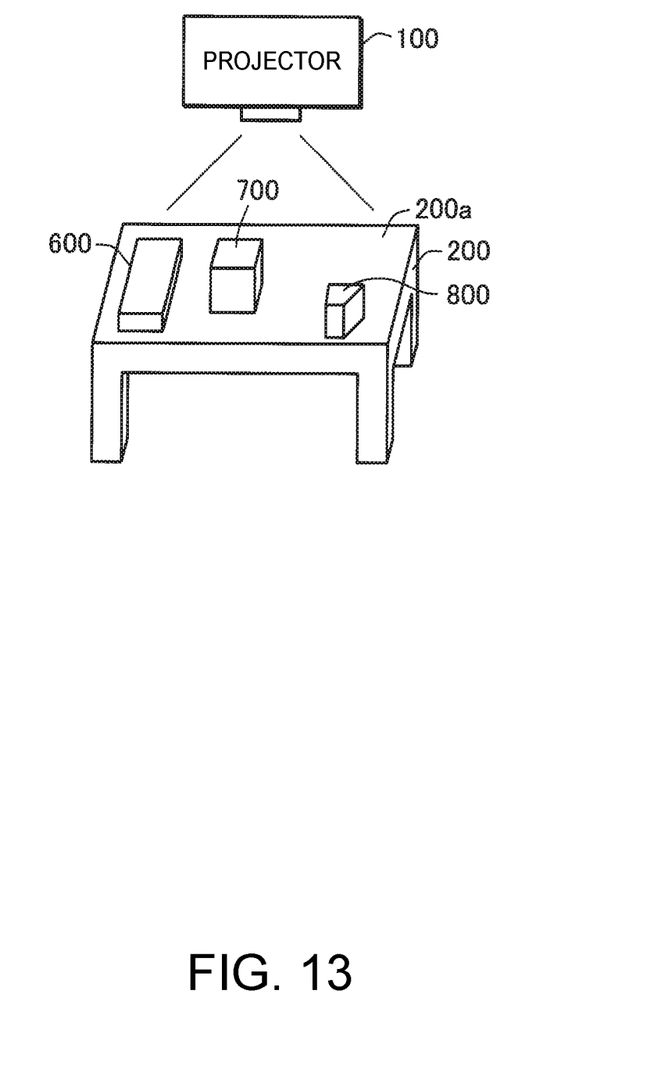
FIG. 13 shows an example of an image projected surface.

An image projected surface on which the projection section 150 projects an image is not limited to the surface (stepped surface) having the table surface 200a and the surface 300a and can be changed. For example, the image projected surface may be a spherical surface or the table surface 200a on which a plurality of objects 600, 700, and 800 are placed, as shown in FIG. 13. Such an image projected surface is an example of a non-flat surface. The image projected surface may still instead be a flat surface. That is, the projector 100 can automatically bring an image portion projected in a position (region) that should be brought into focus into focus both in the case where the image projected surface is a flat surface and the case where the image projected surface is a non-flat surface.

Variation 5

The number of sub-regions is not limited to 12 and only needs to be at least 2. It is, however, noted that the larger the number of sub-regions is, the more satisfactorily the focus adjustment according to the irregularities or any other factor of the image projected surface is performed. Further, the plurality of sub-regions may not have the same shape or area.

Variation 6

In the embodiment described above, the user manually moves the projection lens 153*a* to set the focus information. In a case where the projector 100 has an autofocus function, the autofocus function may be used to set the focus information.

For example, the projector 100 sequentially generates a "pattern image" in each of the sub-regions 6-1 to 6-12 and projects the pattern image whenever the pattern image is generated. The projector 100 uses each of the projected pattern images to perform the autofocus function and stores in the storage 170 the in-focus position of the projection lens 153*a* as the focus information associated with the sub-region where the pattern image has been generated.

Variation 7

In step S105 shown in FIG. 11, in a case where the number of maximum sub-regions is two or greater, the generation section 181 identifies, out of the plurality of maximum sub-regions, a maximum sub-region where an image to be projected at a location closest to the projector 100 is generated.

The generation section 181 may instead identify, out of the plurality of maximum sub-regions, a maximum sub-region where an image to be projected at a location farthest to the projector 100 is generated.

In the case where the number of maximum sub-regions is two or greater, the control section 183 may calculate the average of the positions indicated by the pieces of focus information corresponding to the maximum sub-regions and move the projection lens 153*a* to the average position.

In a case where the areas of the plurality of sub-regions are not equal to one another, the generation section 181 may identify a maximum sub-region having the largest area out of the plurality of maximum sub-regions.

Variation 8

An image projected by the projector 100, for example, a sub-image is not limited to the image shown in FIG. 5 or 7 and can be changed as appropriate. For example, an image projected by the projector 100 may be a simple white image usable as illumination light or a rendering image for rendering a commodity.

Variation 9

The region where the projection section 150 can project a content image is not limited to the table surface 200*a* and can be changed as appropriate.

Variation 10

The liquid crystal light valves 152 are used as the light modulator, and the light modulator may not be formed of the liquid crystal light valves 152 and can be changed as appropriate. For example, the light modulator may instead be configured to use three reflective liquid crystal panels. The light modulator may still instead, for example, be configured to use one liquid crystal panel, three digital mirror devices (DMDs), or one digital mirror device. In the case where only one liquid crystal panel or DMD is used as the light modulator, no members corresponding to the color separation system and the light combining system are required. Further, a configuration including no liquid crystal panel or DMD but capable of modulating the light emitted from the light source 151 can be employed as the light modulator.

Variation 11

The entirety or part of the elements achieved by the processor 180 that reads and executes the program may be achieved by hardware formed, for example, of a field programmable gate array (FPGA), an application specific IC (ASIC), or any other electronic circuit or may be achieved by software and hardware that cooperate with each other.

What is claimed is:

1. A projector comprising:
   a projection section capable of projecting an image according to image information in a predetermined region, the image being generated based on: (i) a first image, and (ii) a second image that applies a rendering effect to the first image, and the image information including image data representing the first image and rendering effect data representing the second image; and
   a processor programmed to:
   generate position identification information that identifies a position that should be brought into focus in the predetermined region based on the rendering effect data in the image information,
   acquire the generated position identification information, and
   control the projection section based on the acquired position identification information in such a way that the position is brought into focus.

2. The projector according to claim 1, wherein the position is a region where the projection section projects an image.

3. The projector according to claim 1, wherein
   the position identification information is added to the image information; and
   the processor acquires the position identification information added to the image information.

4. The projector according to claim 1, wherein
   the projection section includes a projection system that projects the image, and
   the processor controls the projection system based on the position identification information in such a way that the position is brought into focus.

5. The projector according to claim 4, wherein
   the projection section further includes
   a light source that emits light, and
   a light modulator that modulates the light from the light source in accordance with the image information,
   the position identification information represents a first region where an image to be projected in the position is generated out of a plurality of regions that form an image region of the light modulator, and
   the processor controls the projection system based on the position identification information in such a way that the image generated in the first region is brought into focus in the position.

6. The projector according to claim 1, wherein the projection section projects an image having a predetermined shape.

7. The projector according to claim 1, wherein the predetermined region is a non-flat surface.

8. A method for controlling a projector including a projection section capable of projecting an image according to image information in a predetermined region, the image being generated based on: (i) a first image, and (ii) a second image that applies a rendering effect to the first image, and the image information including image data representing the first image and rendering effect data representing the second image, the method comprising:
generating position identification information that identifies a position that should be brought into focus in the predetermined region based on the rendering effect data in the image information;
acquiring the generated position identification information that identifies a position that should be brought into focus in the predetermined region; and
controlling the projection section based on the acquired position identification information in such a way that the position is brought into focus.

9. A projector comprising:
a projection section capable of projecting an image according to image information in a predetermined area, the projection section including:
a light source that emits light,
a light modulator that modulates the light from the light source in accordance with the image information, and
a projection system that projects the image; and
a processor programmed to:
acquire position identification information that identifies a position that should be brought into focus in the predetermined region, the position identification information including a first region where an image to be projected in the position is generated out of a plurality of regions that form an image region of the light modulator; and
controls the projection system based on the acquired position identification information in such a way that the image generated in the first region is brought into focus in the position.

10. The projector according to claim 9, wherein the position is a region where the projection section projects an image.

11. The projector according to claim 9, wherein
the position identification information is added to the image information; and
the processor acquires the position identification information added to the image information.

12. The projector according to claim 9, wherein the processor is further programmed to:
generate the position identification information based on the image information, and
acquire the generated position identification information.

13. The projector according to claim 9, wherein the projection section projects an image having a predetermined shape.

14. The projector according to claim 9, wherein the predetermined region is a non-flat surface.

* * * * *